US012756637B1

(12) United States Patent
Cui

(10) Patent No.: US 12,756,637 B1
(45) Date of Patent: Oct. 6, 2026

(54) RECENCY-WEIGHTED DISCOVERY AND TEMPORAL ANALYSIS OF DOMAIN NAME SERVER RECORDS FOR GENERATING LEAD SIGNALS

(71) Applicant: Intuit Inc., Mountain View, CA (US)

(72) Inventor: Sophia Cui, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/449,369

(22) Filed: Jan. 14, 2026

(51) Int. Cl.

| | |
|---|---|
| ***H04L 41/16*** | (2022.01) |
| ***G06F 16/245*** | (2019.01) |
| ***G06F 17/18*** | (2006.01) |
| ***G06F 18/20*** | (2023.01) |
| ***G06N 20/00*** | (2019.01) |
| ***H04L 9/40*** | (2022.01) |
| ***H04L 61/4511*** | (2022.01) |
| ***H04L 61/4541*** | (2022.01) |
| *G06N 20/20* | (2019.01) |

(52) U.S. Cl.
CPC ............ *H04L 41/16* (2013.01); *G06F 16/245* (2019.01); *G06F 17/18* (2013.01); *G06F 18/20* (2023.01); *H04L 61/4511* (2022.05); *H04L 61/4541* (2022.05); *H04L 63/08* (2013.01); *G06N 20/00* (2019.01); *G06N 20/20* (2019.01)

(58) Field of Classification Search
CPC . H04L 41/16; H04L 61/4511; H04L 61/4541; H04L 63/08; G06N 20/00; G06N 20/20; G06F 18/20; G06F 16/245; G06F 17/18
See application file for complete search history.

(56) References Cited

U.S. PATENT DOCUMENTS

| | | | | |
|---|---|---|---|---|
| 2019/0141077 | A1* | 5/2019 | Tyler | G06F 21/606 |
| 2021/0374526 | A1* | 12/2021 | Chang | G06N 3/08 |
| 2025/0267156 | A1* | 8/2025 | Pickman | H04L 63/1408 |
| 2026/0058991 | A1* | 2/2026 | Liu | H04L 63/1416 |
| 2026/0089170 | A1* | 3/2026 | Wang | H04L 63/14 |

* cited by examiner

*Primary Examiner* — Umar Cheema
*Assistant Examiner* — Adam A Cooney
(74) *Attorney, Agent, or Firm* — Lathrop GPM LLP

(57) ABSTRACT

A method includes identifying, from a multitude of raw domain name system records of a source domain, a domain name system pattern corresponding to a raw domain name system record. The domain name system pattern is categorized, by a large language model to obtain a pattern category. A feature vector of the source domain is generated based on the multitude of raw domain name system records and the pattern category. The feature vector is compared to a historical feature vector of the source domain to obtain a feature vector difference. The feature vector difference is categorized to obtain an email stack change event of the source domain. An email volume index score is calculated based on the feature vector and the email stack change event for the source domain. The source domain and the email volume index score are transmitted to a user application.

19 Claims, 7 Drawing Sheets

Example of candidate domains

| domain | evi_score | tier | reason_codes |
|---|---|---|---|
| 002handz.com | 3 | Tier 3 (Low) | Standard Profile |
| 1-800flags.com | 14 | Tier 2 (Medium) | Competitive Insight: Uses competitor(s) (Klaviyo) |
| 1000islandairboats.com | 71 | Tier 2 (Medium) | High SPF Complexity (Uses Flattening) |
| 1001painting.com | 9 | Tier 2 (Medium) | Standard Profile |
| 100kideas.org | 88 | Tier 1 (High) | Strong DMARC Reject Policy |
| 1019lab.com | 6 | Tier 3 (Low) | Standard Profile |
| 101mobility.com | 22 | Tier 2 (Medium) | Opportunity: Uses a transactional-first ESP (Amazon SES); Opportunity: Potential to consolidate multiple marketing platforms; Competitive Insight: Uses competitor(s) (Amazon SES, Hubspot) |
| 10GFEDSUPPLY.COM | 83 | Tier 1 (High) | Strong DMARC Reject Policy |
| 10roswell.com | 6 | Tier 3 (Low) | Standard Profile |
| 10xinteractive.com | 3 | Tier 3 (Low) | Standard Profile |
| 11seriesenergy.com | 3 | Tier 3 (Low) | Standard Profile |
| 120vc.com | 14 | Tier 2 (Medium) | Competitive Insight: Uses competitor(s) (HubSpot) |
| 12306.cn | 3 | Tier 3 (Low) | Standard Profile |
| 1234gorecords.com | 6 | Tier 3 (Low) | E-commerce Platform Detected (Shopify); Opportunity: E-commerce store with no marketing platform |
| 123cleanllc.com | 6 | Tier 3 (Low) | Standard Profile |
| 130represent.c com | 6 | Tier 3 (Low) | Standard Profile |
| 145.aero | 9 | Tier 2 (Medium) | Standard Profile |

302 304 306 308

FIG. 3A

| dmarc_policy | esp_marketing | primary_mail | security_provider | other_saas | platform_integration |
|---|---|---|---|---|---|
| | | Google Workspace | | | |
| none | Klaviyo | | | | Google |
| none | | Microsoft Outlook | Valimail (SPF Alignment) | | |
| | | | | | Google |
| reject | Mailchimp | Google Workspace | | | |
| | | | | Zoho | |
| none | Amazon SES, HubSpot | Microsoft 365, Microsoft Outlook | | WP Engine | Google |
| reject | | | | GoDaddy | |
| | | | | Name.com, Zoho | |
| | | | | Zoho | |
| | | Google Workspace | | | |
| none | HubSpot | Microsoft Outlook | | | |
| | | Self-hosted | | | |
| none | | Google Workspace | | Shopify | Facebook |
| | | Microsoft 365, Microsoft Outlook | | | |
| | | Microsoft Outlook | | | |
| | | | | | Google |

310 312 314 316 318

*FIG. 3B*

402

Recency-weighted score Parameters

Candidate pattern:
include:_netblocks.mimecast.com
Half-life (λ): 30 days. Each sighting's weight halves ever 30 days.
Current evaluation time ($t_0$): December 12, 2025, 00:00 UTC.
Sightings: Occurrences of the candidate pattern observed in DNS records, each from a unique domain and recorded with a timestamp.
Thresholds:
Minimum unique domains: 5.
Minimum recency-weighted score: 2.0.

406

Observed Sightings (unique domains)

| Domain | Sighting Timestamp (UTC) | Age Δt (days) | Decayed Weight $w_i$ |
|---|---|---|---|
| alpha.com | 2025-12-10 | 2 | $(1/2)^{2/30} \approx 0.955$ |
| beta.org | 2025-11-25 | 17 | $(1/2)^{17/30} \approx 0.667$ |
| gamma.net | 2025-11-01 | 41 | $(1/2)^{41/30} \approx 0.395$ |
| delta.io | 2025-10-15 | 58 | $(1/2)^{58/30} \approx 0.287$ |
| epsilon.biz | 2025-09-20 | 83 | $(1/2)^{83/30} \approx 0.193$ |
| zeta.co | 2025-08-01 | 133 | $(1/2)^{133/30} \approx 0.099$ |

Exponential Decay Formula

For a sighting observed at time $t_i$, with age $\Delta t_i = t_0 - t_i$ (in days), the decayed weight $w_i$ is:

$$w_i = \left(\frac{1}{2}\right)^{\Delta t_i/\lambda}$$

The recency-weighted score $S$ is the sum of all decayed weights across unique domains:

$$S = \sum_{i=1}^{N} w_i$$

Where $N$ is the number of unique domains in which the pattern was observed.

404

Compute the Recency-Weighted Score

S ≈0.955 + 0.667 + 0.395 + 0.287 + 0.193 +0.0
99 = 2.696S
Unique domains N: 6
Score S: ~2.696

Promotion Decision

Check unique-domain threshold: N=6≥5N = 6 \ge 5N=6≥5 ⟶Pass.
Check recency-weighted score: S=2.696≥2.0S = 2.696 \ge 2.0S=2.696≥2.0 ⟶Pass.

408

FIG. 4

Raw DNS Data

```
jpmorganchase.com,TXT,N/A,autodesk-domain-verification=B1dybw2p14HhzRJ6P1Lh
jpmorganchase.com,TXT,N/A,mongodb-site-verification=qPbDuchhtQYIqlKDlae7nShL8jRbZnMm
jpmorganchase.com,TXT,N/A,facebook-domain-verification=816oi5gnuexp0l05fhxdgqx8q54trg
jpmorganchase.com,TXT,N/A,1+O.eVj+6WU8nviuB808qQzlr5eDntCB8k7FzukbGTbj3Dc5kbSARbPTzbx7RIgFLqoelsr7PwjROrD6uEFN0w==
jpmorganchase.com,TXT,N/A,ge+apI3K6/59IDwtaIXwfnfzb30RxF000kmNQ4ahH9d1577qWYONOnvx500PoHsnuel5bUPlE+VOAWqZdCJCYg==
jpmorganchase.com,TXT,N/A,Dynatrace-site-verification=2e4f1787-2bd3-46c1-82b7-98b9f291ca48__u9ds5porm9j7ta4qe6gc78qqlu
jpmorganchase.com,TXT,N/A,Dynatrace-site-verification=8359e391-5c93-4b76-813a-9064af8cb8de__4082hmgreaq9fp2v8okkh74bfeh
jpmorganchase.com,SPF,N/A,v=spf1 a:spf.jpmchase.com ip4:207.162.228.0/24 ip4:207.162.229.0/24 ip4:207.162.225.0/24 ip4:196.37.232.50
ip4:159.53.46.0/24 ip4:159.53.36.0/24 ip4:159.53.110.0/24 ip4:170.148.48.0/24 ip4:159.53.78.0/24 -all
jpmorganchase.com,DMARC,N/A,v=DMARC1; p=reject; pct=100; rua=mailto:d@rua.agari.com; ruf=mailto:d@ruf.agari.com; fo=1
```
502

```
berkshirehathaway.com,MX,5,berkshirehathaway-com.mail.protection.outlook.com.
berkshirehathaway.com,TXT,N/A,MS=ms23357683
berkshirehathaway.com,SPF,N/A,v=spf1 include:spf.protection.outlook.com -all
berkshirehathaway.com,DMARC,N/A,v=DMARC1;p=reject
```
504

```
1cbc-us.com,MX,5,mail.icbc-us.com.
1cbc-us.com,MX,10,mail2.icbc-us.com.
1cbc-us.com,MX,20,mx1.icbc.com.cn.
1cbc-us.com,MX,50,mx2.icbc.com.cn.
1cbc-us.com,SPF,N/A,v-spf1 include:spf.icbc-us.com include:spf.icbc.com.cn -all
1cbc-us.com,DMARC,N/A,No record found
```
506

```
aramco.com,MX,5,smtp1.aramco.com.
aramco.com,MX,5,smtp2.aramco.com.
aramco.com,MX,5,smtp3.aramco.com.
aramco.com,MX,5,smtp4.aramco.com.
aramco.com,MX,5,smtp5.aramco.com.
aramco.com,MX,5,smtp6.aramco.com.
aramco.com,MX,5,smtp7.aramco.com.
aramco.com,MX,5,smtp8.aramco.com.
```
508

FIG. 5

RECENCY-WEIGHTED DISCOVERY AND TEMPORAL ANALYSIS OF DOMAIN NAME SERVER RECORDS FOR GENERATING LEAD SIGNALS

BACKGROUND

Modern email ecosystems are frequently updated to accommodate infrastructure changes, security enhancements, or service migrations. The updates of an email ecosystem of an enterprise may be reflected in the domain name system (DNS) records of diverse source domains owned and operated by the enterprise. DNS records may serve to provide visibility into the operational complexity and maturity of the email technology infrastructure of an enterprise. Analytics of DNS records may serve to predict and quantify changes in email sending behavior based on evolving DNS configurations. Actionable insights into whether a domain is preparing for increased email volume, shifting authentication posture, or introducing new sending infrastructure may be derived for security and compliance recommendations, or improved customer visibility and outreach.

Raw DNS records ingested in real time may be fragmented in nature. DNS records may be distributed, time-stamped, and subject to frequent changes. A challenge arises in analyzing static snapshots of DNS records to capture nuanced patterns or temporal differences. Another challenge arises in identifying and quantifying meaningful changes that correlate raw DNS data with historical DNS data in a way that is predictive for generation of recommendations.

SUMMARY

In general, in one aspect, one or more embodiments relate to a method. The method includes identifying, from a multitude of raw DNS records of a source domain, a DNS pattern corresponding to a raw DNS record. The method further includes categorizing, by a large language model (LLM), the DNS pattern to obtain a pattern category. The method further includes generating a feature vector of the source domain based on the multitude of raw DNS records and the pattern category. The method further includes comparing the feature vector to a historical feature vector of the source domain to obtain a feature vector difference. The method further includes categorizing the feature vector difference to obtain an email stack change event of the source domain. The method further includes calculating, based on the feature vector, and the email stack change event, an email volume index (EVI) score for the source domain. The method further includes transmitting the source domain and the EVI score to a user application.

In general, in one aspect, one or more embodiments relate to a system. The system includes at least one computer processor, and a temporal difference engine, executing on the at least one computer processor. The system further includes an LLM, executing on the at least one computer processor. The system further includes a pattern analysis engine, executing on the at least one computer processor. The pattern analysis engine is configured to identify, from a multitude of raw domain name system (DNS) records of a source domain, a DNS pattern corresponding to a raw DNS record. The pattern analysis engine is further configured to cause the LLM to categorize the DNS pattern to obtain a pattern category. The pattern analysis engine is further configured to generate a feature vector of the source domain based on the multitude of raw DNS records and the pattern category. The pattern analysis engine is further configured to cause the temporal difference engine to perform operations including comparing the feature vector to a historical feature vector of the source domain to obtain a feature vector difference. The operations further include categorizing the feature vector difference to obtain an email stack change event of the source domain. The operations further include calculating, based on the feature vector, and the email stack change event, an email volume index (EVI) score for the source domain. The operations further include transmitting the source domain and the EVI score to a user application.

In general, in one aspect, one or more embodiments relate to a method. The method includes ingesting, from a source domain, a multitude of raw DNS records. The method further includes detecting a DNS pattern within the multitude of raw DNS records. The method further includes dynamically updating a pattern registry based on the DNS pattern. The method further includes categorizing the DNS pattern to obtain a pattern category. The method further includes generating an email technology stack analysis of the source domain based on the DNS pattern and the pattern category. The method further includes transmitting the email technology stack analysis to a user application.

Other aspects of one or more embodiments will be apparent from the following description and the appended claims.

BRIEF DESCRIPTION OF DRAWINGS

FIGS. 3A, 3B, 4, and 5 show examples, in accordance with one or more embodiments.

Like elements in the various figures are denoted by like reference numerals for consistency.

DETAILED DESCRIPTION

One or more embodiments are directed to extracting and dynamically discovering patterns in DNS records. DNS records that match existing or emerging DNS patterns are identified from a multitude of raw DNS records ingested from a source domain. By generating recency-weighted scores of matching DNS records that are similar in pattern, a DNS pattern may be dynamically recognized and stored. The DNS pattern is then categorized by a large language model (LLM) to obtain a pattern category which is a semantic interpretation of the DNS pattern.

A feature vector of the source domain based on the multitude of raw DNS records and the pattern category may be generated, to be used as a structured representation of the domain's email technology stack state. The feature vector may be compared to a historical feature vector of the source domain, and the differences categorized, to obtain one or more email stack change events of the source domain. An email volume index (EVI) is calculated based on the feature vector and the email stack change events. The EVI score provides a quantitative measure of expected email activity, enabling downstream applications to make recommendations for security, compliance, customer visibility, outreach, and engagement strategies.

Figure 1:
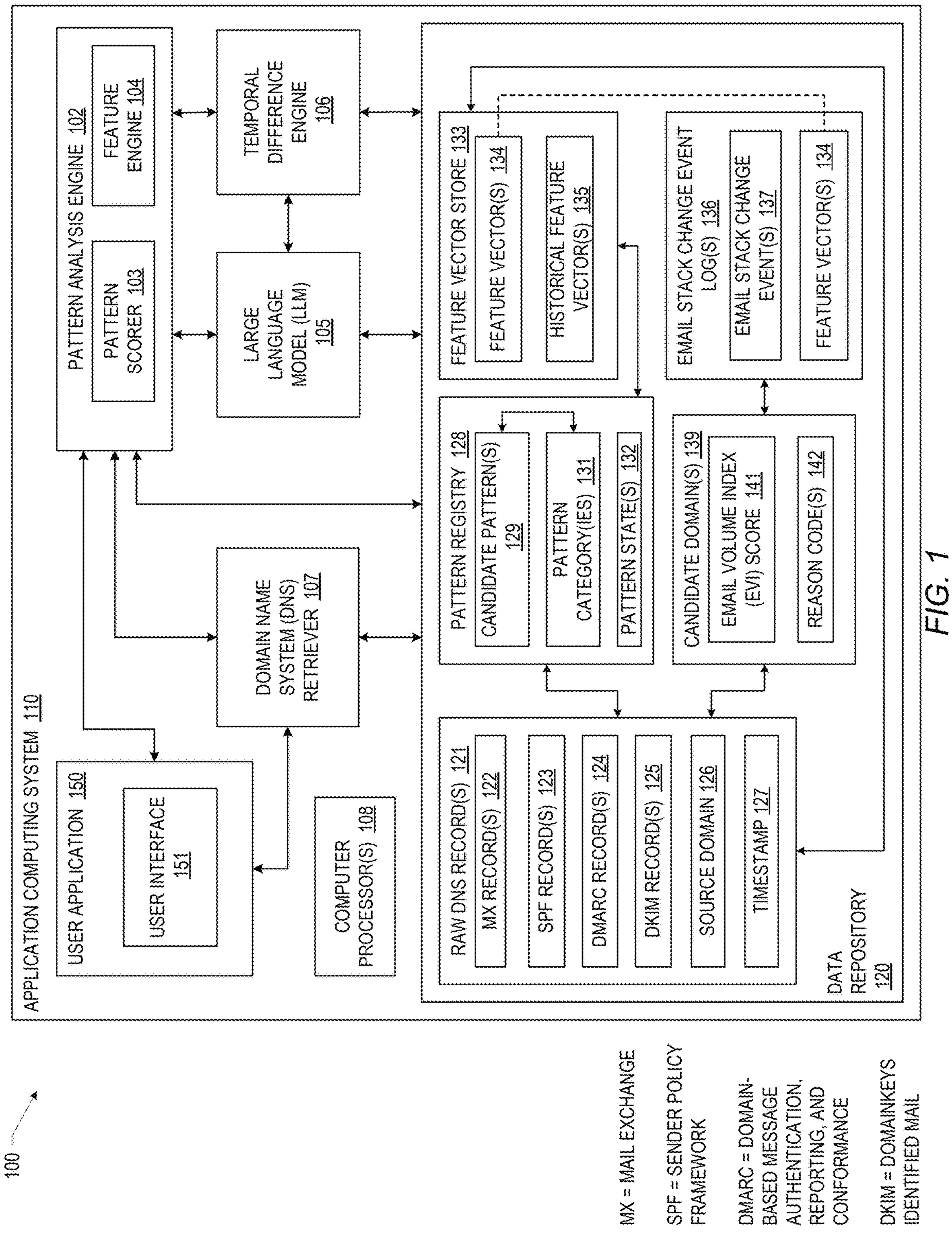
FIG. 1 shows an application computing system, in accordance with one or more embodiments.

Attention is now turned to the figures. FIG. 1 shows a computing system, in accordance with one or more embodiments.

ments. The system shown in FIG. 1 may include an application computing system (110). The application computing system (110) includes one or more computer processors (108), data repositories, communication devices, and supporting hardware and software. The application computing system (110) may be in a distributed computing environment. The application computing system (110) includes one or more computer processor(s) (108). The one or more computer processor(s) (108) may be one or more hardware or virtual processors which may execute computer readable program code that defines one or more applications, such as the pattern analysis engine (102), the LLM (105), the temporal difference engine (106), the DNS retriever (107), and the user application (150). An example of the computer processor(s) (108) is further described with respect to the computer processor(s) (602) of FIG. 6A. Thus, the application computing system (110) is configured to execute one or more applications, such as the pattern analysis engine (102), the LLM (105), the temporal difference engine (106), the DNS retriever (107), and the user application (150). An example of a computer system and network that may form the application computing system (110) is described with respect to FIG. 6A and FIG. 6B.

The application computing system (110) includes a data repository (120). The data repository (120) is a type of storage unit or device (e.g., a file system, database, data structure, or any other storage mechanism) for storing data. The data repository (120) may include multiple different, potentially heterogeneous, storage units and/or physical storage devices.

The data repository (120) includes multiple data structures for recency-weighted discovery, temporal analysis, and lead prioritization. Specifically, the data repository (120) includes raw DNS record(s) (121) ingested from a source domain (126) along with a timestamp (127) to preserve temporal context. Diverse types of raw DNS record(s) include mail exchange (MX) record(s) (122), sender policy framework (SPF) record(s) (123), domain-based message authentication, reporting and conformance (DMARC) record(s) (124), and domainkeys identified mail (DKIM) record(s) (125).

The diverse types of raw DNS records may be characterized to model a state of operation of the email technology stack deployed by an organization having a particular internet domain address. An email technology stack refers to the collection of software components, protocols, and services that enable an organization to send, receive, authenticate, and secure email communications associated with its internet domain. An email technology stack may include mail servers for routing messages, authentication mechanisms such as SPF, DKIM, and DMARC for validating sender identity and preventing spoofing, and additional security or compliance layers such as encryption gateways or filtering services. The email technology stack may also integrate with third-party platforms for marketing automation, transactional messaging, or analytics. As used herein, the terms "email technology stack" and "email stack" are interchangeable and refer to the email technology stack deployed by an organization.

An organization virtually "located" at a particular domain address may deploy multiple products and services to manage email flows. For example, the organization's primary domain may handle inbound and outbound email traffic. Additionally, the organization may authorize other domains or subdomains belonging to external vendors to send emails on its behalf. The authorizations of an organization with external vendors, and other relationships may be expressed in DNS records such as SPF includes, DKIM selectors, and DMARC policies. Thus, the DNS records collectively define the operational state and complexity of the email technology stack.

By way of example, consider a domain "abc.com," for an organization, ABC Corp. ABC Corp. may use Microsoft Outlook® or Mimecast® as its mail server, which is reflected in MX records pointing to outlook.com or mimecast.com. The SPF record of ABC Corp. from the domain abc.com might include mechanisms such as include: spf.protection.outlook.com and include: _netblocks.mimecast.com, indicating that both services are authorized to send email on behalf of abc.com. A DMARC record for abc.com may specify a strict policy such as p=reject; rua-mailto: dmarc-reports@abc.com, signaling strong enforcement and reporting for unauthenticated messages. DKIM records may define cryptographic keys under selectors like selector1._domainkey.abc.com, enabling message integrity verification. In this case, characterization of the raw DNS records from "abc.com" may result in an operational model representing the operating state of the email technology stack of "abc.com." The operational model may indicate that abc.com deploys a complex email technology stack with layered security, vendor integrations, and compliance features.

Referring to the diverse types of raw DNS records, the Mail exchange records (MX) (122) specify the mail servers responsible for receiving email for a domain. Multiple MX records or high-priority MX servers may indicate redundancy and enterprise-grade email infrastructure. The presence of premium gateways, for example, Proofpoint® or Mimecast® may indicate advanced security and scalability capabilities. Sender policy framework (SPF) (123) records define authorized mail servers for sending emails on behalf of the domain, reducing spoofing risk. Complex SPF records with multiple includes or flattening services indicate integration with multiple email vendors and higher sophistication. Domain-based message authentication, reporting and conformance (DMARC) (124) records provide policy for handling unauthenticated emails and enable reporting. Strict DMARC policies such as "p-reject" and reporting endpoints show strong security posture and maturity. DomainKeys Identified Mail (DKIM) (125) records add cryptographic signatures to emails for integrity and authenticity. The presence of DKIM with multiple selectors or advanced key rotation indicates robust email authentication practices.

Notably, SPF, DMARC, and DKIM records may be implemented as TXT (Text) records in the DNS. A TXT record is a flexible DNS resource record type that associates text data with a domain. TXT records are suitable for publishing authentication policies and cryptographic keys. SPF records may be TXT entries to declare authorized mail servers, DMARC records may be TXT entries defining enforcement and reporting policies, and DKIM records may be TXT entries of public keys for signature verification. In contrast, Mail Exchange (MX) records may be a distinct DNS resource record type that specifies the hostnames of mail servers responsible for receiving email for the domain. Unlike TXT records, which represent, or capture, policy and metadata, MX records may directly control routing of inbound email traffic by defining priority and destination servers.

The data repository (120) further includes a pattern registry (128). The pattern registry (128) is a logical data structure for the storage and management of DNS patterns derived from raw DNS record(s) (121). In the context of DNS records, a "pattern" refers to a distinct string or tokenized element extracted from a DNS record that represents a vendor-specific or service-specific configuration associated with email infrastructure. Patterns may be identified, or recognized, from SPF "include" statements, TXT key-value pairs, or other DNS attributes that identify integrations with email service providers, security gateways, or platform tools. For example, in an SPF record, "include: spf.protection.outlook.com" is a pattern indicating Microsoft Outlook® integration. As another example, in a TXT record, "v=spf1 include: _netblocks.mimecast.com" reveals Mimecast® as an authorized sender. Patterns may be considered as atomic indicators of technology usage and serve as building blocks for feature vectors that characterize the email technology stack of a domain.

The pattern registry maintains candidate pattern(s) (129) that represent newly discovered DNS strings extracted from MX record(s) (122), SPF record(s) (123), DMARC record(s) (124), and DKIM record(s) (125). Each candidate pattern may be associated with a timestamp (127). A candidate pattern may further be associated with a recency-weighted score, and a unique-domain count to support lifecycle decisions. The pattern registry further includes a pattern state(s) (132). The pattern states (132) include a "candidate" state and a "promoted" state. The pattern states (132) are assigned to the candidate patterns (129), indicating whether a candidate pattern (129) is in a "candidate" state or has been "promoted" after validation. In addition, the pattern registry stores pattern category (ies) (131) generated by a large language model (LLM). The pattern categories (131) are semantic classifications of patterns. For example, a string parsed from DNS records such as "include: _netblocks.mimecast.com" may be semantically classified as "security vendor," because Mimecast® provides email security and filtering services. Similarly, a DNS string such as "include: shops.shopify.com" or "include: _spf.salesforce.com" may be semantically classified as "platform integration," because these patterns indicate that the domain integrates with external platforms like Shopify® (for e-commerce) or Salesforce® (for CRM and marketing automation). Thus, the pattern state and pattern category of a candidate pattern facilitates lifecycle management and semantic enrichment for downstream feature extraction and scoring.

The data repository (120) further includes a feature vector store (133), which is configured to store feature vector(s) (134) derived from raw DNS record(s) (121) and promoted pattern(s) (129), as well as historical feature vector(s) (135) corresponding to prior timestamps. In one or more embodiments, a feature vector (134) may be constructed from a candidate pattern (129) that has achieved a "promoted" state in the pattern registry (128) and further, has been semantically classified by the large language model (LLM). Further, the feature vector (134) may be constructed corresponding to a given domain. Using promoted patterns corresponding to the given domain ensures that the feature vectors represent validated indicators of email infrastructure rather than transient or noisy observations. Thus, if a promoted pattern is observed for a given domain, then the raw DNS records (121) for the given domain, and the promoted pattern are used to construct the feature vector (133).

Feature extraction may generate a feature vector of primary features. The primary features may be categorical features. The primary features may represent the presence or absence of specific technologies or configurations. For example, the feature vector may include indicators such as "has_dmarc_policy," "uses_spf_flattening," or "num_mx_records," which are derived from DNS attributes and pattern categories. A categorical feature value may indicate a particular marketing email service provider (ESP) (e.g., Mailchimp®), a particular security vendor (e.g., Mimecast®), or a particular platform integration (e.g., Salesforce® or Shopify®).

After primary features are extracted, composite features may be derived from the primary features. Composite features may include higher-level attributes such as "has_premium_security," which evaluates whether the domain uses advanced gateways like Proofpoint® or Agari®. Another composite feature may be "uses_spf_flattening," which indicates optimization of SPF records. Another composite feature may be the email_maturity_score, which reflects the complexity of the domain's email technology stack. The email_maturity_score may be calculated by applying a deterministic function over selected primary features of the given candidate domain. For example, the selected primary features may include the DMARC enforcement level, which is a categorical feature, SPF record complexity (e.g., number of includes, presence of flattening), MX record count, etc. Each of the selected primary features may contribute a fixed weight or category-based score. The sum may be normalized to a predefined range. The email_maturity_score may serve as an input to the Email Volume Index (EVI) score.

The historical feature vector (135) is a feature vector that may correspond to the same set of domains as those from which the feature vectors are generated, but from prior timestamps. The historical feature vector (135) of a particular domain may be compared with the current timestamp feature vector (133) of the particular domain to derive or infer email stack change events for a particular domain.

The data repository (120) further includes an email stack change event log (136). The email stack change event log (136) is a record of email stack change event(s) (137) generated from feature vector differences. An email stack change event (137) is a structured representation of an operational change detected in the email technology stack of a domain over time. Email stack change events (137) may be derived by comparing a current feature vector of the domain against a historical feature vector corresponding to the same domain from a prior timestamp. When the comparison reveals a significant difference in one or more features, for example, the addition of a new email service provider, tightening of a DMARC policy, or deployment of a premium security gateway, the difference is categorized into a named event that signals an operational upgrade (change). Examples of email stack change events may include DMARC_TIGHTENED, indicating that the domain has strengthened its DMARC enforcement policy, suggesting increased focus on email security. An additional example may be ESP_VENDOR_ADDED, showing that the domain has integrated a new email service provider. Other examples include PREMIUM_GATEWAY_ADDED, reflecting adoption of advanced email security solutions such as Proofpoint® or Mimecast®.

Intent events may be logged in an auditable format e.g., JavaScript Object Notation Log (JSONL) and used to boost a time-aware Email Volume Index (EVI) score. Thus, domain selection of candidate domains may be prioritized on recent actions rather than static attributes.

The data repository (120) further includes a set of candidate domain(s) (139). The candidate domains (139) are a set of domains selected for recommendation opportunities based on their email technology stack characteristics, and recent email stack change events. Each candidate domain is associated with a computed EVI score (141) derived from the candidate domain's current feature vector and any detected email stack change events. The EVI score (141)

represents a time-aware measure of email infrastructure activity and configuration complexity for a given domain. Email infrastructure activity refers to changes in the email technology stack of the given domain. In one or more embodiments, the EVI score may be derived from two components, namely, a feature score and an email stack change boost score.

The feature score may be computed by aggregating weighted values assigned to individual features in the current feature vector of the given domain. Individual features may be the number of MX records, presence of SPF flattening, DMARC enforcement level (expressed as categorical states), presence of DKIM selectors, etc. Features may be binary (present/absent), categorical, or numeric (counts). Each feature may be normalized and weighted according to a likely contribution to operational complexity.

The email stack change boost score may be computed by summing weights assigned to the email stack change events. Each email stack change event corresponds to a significant feature transition. The boost weight may reflect the recency and magnitude of change of the feature. The final EVI score may be the sum of the feature score and the email stack change boost score, expressed as a numerical value. The final EVI score may further be mapped to percentile ranks within a cohort distribution. Tier labels may be assigned to the domains based on the percentile rank. The tier label of a given domain may be one of High, Medium, or Low, based on the percentile rank. Thus, the EVI score is a basis for prioritizing recommendation opportunities for a particular domain.

In addition to the EVI score, the candidate domains (139) include reason code(s) (142), which are human-readable explanations of the underlying factors contributing to the score. For example, a reason code may indicate that the domain has adopted a premium security gateway, tightened its DMARC policy, or integrated with a new platform service. The reason codes serve downstream systems in generating actionable recommendations tailored to the domain's current state and observed changes, obviating reliance on manual interpretation of raw DNS data. An example of reason codes is shown in FIG. 3.

The application computing system (110) further includes a pattern analysis engine (102). The pattern analysis engine (102) is software or application-specific hardware, which, when executed on computer processor(s) (108), orchestrates discovery, vetting, categorization, and feature extraction using two cooperating subsystems: a pattern scorer (103) and a feature engine (104). The pattern analysis engine (102) ingests raw DNS record(s) obtained by the DNS retriever (107). The pattern analysis engine (102) further extracts patterns from the raw DNS records and consults the pattern registry to determine whether the extracted patterns correspond to existing promoted pattern(s). Further, the pattern analysis engine (102) may determine if an extracted pattern collides with known entries or satisfies criteria for moving from a "candidate" state to a "promoted" state.

The pattern analysis engine (102) may perform pattern-level validation. A goal of pattern-level validation may be to determine whether a newly extracted DNS pattern, represented as a string or tokens, should be promoted from a "candidate" state to a "promoted" state in the pattern registry (128). The determination may be global in scope. Global scope refers to considering pattern occurrence evidence across multiple domains to ensure that the pattern represents a durable, widely relevant technology indicator rather than a transient or domain-specific anomaly. Metrics such as recency-weighted score and unique-domain count may be applied to occurrences of the newly extracted DNS pattern to validate the significance of the pattern before promotion. Once promoted, the DNS pattern may be eligible for semantic categorization by the large language model (LLM) (105) and for use in feature extraction by the feature engine (104).

Accordingly, in one or more embodiments, the pattern analysis engine (102) may process newly extracted patterns represented as strings or tokens through the pattern scorer (103) to compute recency-weighted scores. The pattern analysis engine may further process the newly extracted patterns with the large language model (LLM) (105) to obtain semantic pattern category (ies). The pattern analysis engine (102) may further verify that validated and promoted pattern(s) are used to build feature vectors. The pattern analysis engine (102) may store enriched artifacts, i.e., promoted patterns, pattern categories, and feature vectors in the data repository. Furthermore, the pattern analysis engine (102) may provide summary status to the user application (150).

The pattern scorer (103) computes a recency-weighted promotion signal for observed DNS strings using timestamped sightings, exponential decay, unique-domain thresholds, and collision guards. In one or more embodiments, for a given candidate pattern represented as a string or tokens, the pattern scorer (103) may aggregate observations of the candidate pattern across diverse domains. The pattern scorer (103) may further apply an exponential decay function to the observations, weighting recent observations over non-recent observations. Exponential decay emphasizes recency, at the same time retaining signal value from older occurrences. For example, a 30-day half-life implies that an occurrence of the candidate pattern from two months ago has one-quarter the weight of an occurrence in the current day, making the promotion decision responsive to current technology usage rather than stale configurations. Thus, downstream analytics are guarded against transient spikes and feature vector(s) (134) are built from promoted and categorized patterns. The promoted candidate patterns serve as durable and meaningful indicators of the email technology stack. An example of calculating a recency-weighted score across domains to determine if a candidate pattern should transition from "candidate" status to "promoted" status is shown in FIG. 4.

Further, the pattern scorer (103) may perform collision checks during pattern promotion, to prevent duplication or semantic conflict of candidate patterns within the pattern registry. When a candidate pattern satisfies recency-weighted and unique-domain thresholds, the pattern scorer (103) may additionally invoke a collision test against the set of existing promoted patterns. The collision test ensures that the candidate string does not already exist in the promoted set. In one or more embodiments, the collision test may further entail resolution of certain aspects, for example wildcard and substring resolution. ensuring that the candidate pattern does not represent a trivial variant of an existing pattern. (e.g., "include: _spf.mailchimp.com" vs. include: "_spf.mailchimp.com. *"). Further, the collision test may further entail resolving the candidate pattern's category to avoid ambiguity during feature extraction (e.g., overlapping vendor identifiers across categories). If a collision is detected, the candidate pattern may either be rejected or merged into the existing promoted entry with updated metadata (e.g., timestamp, domain count).

The feature engine (104) constructs feature vector(s) from the current DNS records using promoted and categorized candidate pattern(s) as anchors. The feature engine (104) may extract primary features that encode presence, absence, or simple counts of technologies and configurations, such as has_dmarc_policy, uses_spf_flattening, and num_mx_records. The feature engine (104) may further extract features from the pattern categories, such as dmarc_policy, esp_marketing, primary_mail, security_provider, other_saas, and platform_integration. Derived categorical features may include has_premium_security (e.g., detection of gateways such as Proofpoint® or Agari®), uses_spf_flattening (e.g., evidence of SPF optimization services), and an email_maturity_score that summarizes email technology stack complexity across authentication, routing, and integration dimensions. The feature engine (104) may further store the current feature vector(s) to the feature vector store in the data repository and supply a machine-readable summary to the user application (150) for visualization and recommendation workflows.

The application computing system (110) includes a large language model (LLM) (105). The LLM (105) is a transformer-based machine learning architecture trained on vast corpora of text and structured data to learn statistical relationships between tokens and sequences. LLMs have advanced capabilities in generating natural language output in response to prompts expressed in natural language. LLMs can further interpret textual content in machine-readable formats such as Javascript Object Notation (JSON) files, DNS records, and tokenized patterns. In the system (100) of FIG. 1, the LLM (105) performs semantic classification of candidate pattern(s) to pattern categories such as dmarc_policy, esp_marketing, primary_mail, security_provider, other_saas, and platform_integration. In one or more embodiments, the LLM may further synthesize human-readable reason codes from pattern categories and email stack change events. The reason codes may be explanations of and/or insights on the state of an email technology stack of a particular domain. Examples of LLMs include GPT5 from OpenAIR®, Gemini 3 from Google®, etc.

The application computing system (110) further includes a temporal difference engine (106). The temporal difference engine (106) is software or application-specific hardware, which, when executed on one or more computer processors (108) is configured to compare a current feature vector of a domain at a current timestamp and a historical feature vector corresponding to the same domain at a prior timestamp. The temporal difference engine (106) may output structured differences between the feature vectors, suitable for email stack change inference. In one or more embodiments, the temporal difference engine (106) may be invoked after the feature engine (104) persists (stores in permanent data storage) the current feature vector(s). More specifically, the temporal difference engine (106) may analyze the two feature vectors to detect significant feature changes. Significant feature changes may be defined as transitions in feature values that indicate a material change in a domain's email technology stack, rather than minor or incidental variations. A significant feature change may occur when a feature of the feature vector transitions between states that alter the operation of the stack. For example, a DMARC policy feature may change from "none" to "reject." This change signals a stricter enforcement policy, which may be characterized by an email stack change event "DMARC_TIGHTENED." Further, addition of a pattern category to the candidate pattern "security_vendor," with the feature value "Mimecast®" may signal an email stack change event "PREMIUM_GATEWAY_ADDED." The feature transitions may not be limited to binary changes. The feature transitions may include ordinal or categorical changes, for example, an SPF flattening indicator changing from "absent" to "present," or an increase in the number of MX records to exceed a threshold. The temporal difference engine (106) may be configured to apply filters to exclude trivial differences and focus on changes to features that materially impact the email technology stack.

The outputs of the temporal difference engine (106) are email stack change events, which are structured, named representations of these significant feature changes. Each email stack change event may include metadata such as the affected feature, the prior and current values, the timestamp of detection, and a confidence score. The email stack change events may be persisted in an auditable log and may be used to adjust time-aware scoring (e.g., EVI boost) and generate human-readable reason codes. Summary status and recommendations derived from the email stack change events may be transmitted to the user application (150) for review.

The application computing system (110) further includes a domain name system (DNS) retriever (107). The DNS retriever (107) is configured to obtain raw DNS record(s) for a specified domain list and to annotate those records with retrieval timestamp(s). The DNS retriever (107) queries resource record sets including mail exchange (MX) record(s), sender policy framework (SPF) record(s), domain-based message authentication, reporting and conformance (DMARC) record(s), and domainkeys identified mail (DKIM) record(s), and persists the resulting material to the data repository for subsequent analysis. In some embodiments, the DNS retriever (107) may honor DNS time-to-live (TTL) values and apply rate limiting, caching, and backoff policies to ensure stable operation across large cohorts. The DNS retriever (107) may provide the acquired records to the pattern analysis engine (102).

The application computing system (110) further includes a user application (150). In one or more embodiments, the user application (150) may be a web-based client application, operating within a web browser. Other embodiments of the user application (150) may include native desktop applications, mobile applications, remote desktop clients, etc. The user application (150) provides an operational environment in which domains are selected for recommendation opportunities and in which outputs such as an email volume index (EVI) score, tier labels, and human-readable reason codes are presented to an operator. The user application includes a user interface (151). In the user interface (151) summary and drill-down views, including per-domain feature vectors, associated email stack change events, may be presented. Via the user interface (151), requests may be initiated to ingest or refresh domain data, trigger pattern analysis, and request computation of updated EVI scores and tier assignments.

Collectively, the components shown in the diagram implement a pipeline in which the user application (150) initiates analysis, the DNS retriever (107) acquires authoritative records, the pattern analysis engine (102) validates and categorizes observed strings with assistance from the pattern scorer (103) and the LLM (105), the feature engine (104) derives primary and categorical features and composites from promoted patterns, and the temporal difference engine (106) evaluates changes over time to support email stack change inference and time-aware scoring. Outputs including the feature vectors, EVI scores, tier labels, and reason codes may be persisted in the data repository and rendered in the user interface (151) as recommendation opportunities.

While FIG. 1 shows a configuration of components, other configurations may be used without departing from the scope of one or more embodiments. For example, various components may be combined to create a single component. As another example, the functionality performed by a single component may be performed by two or more components.

Figure 2:
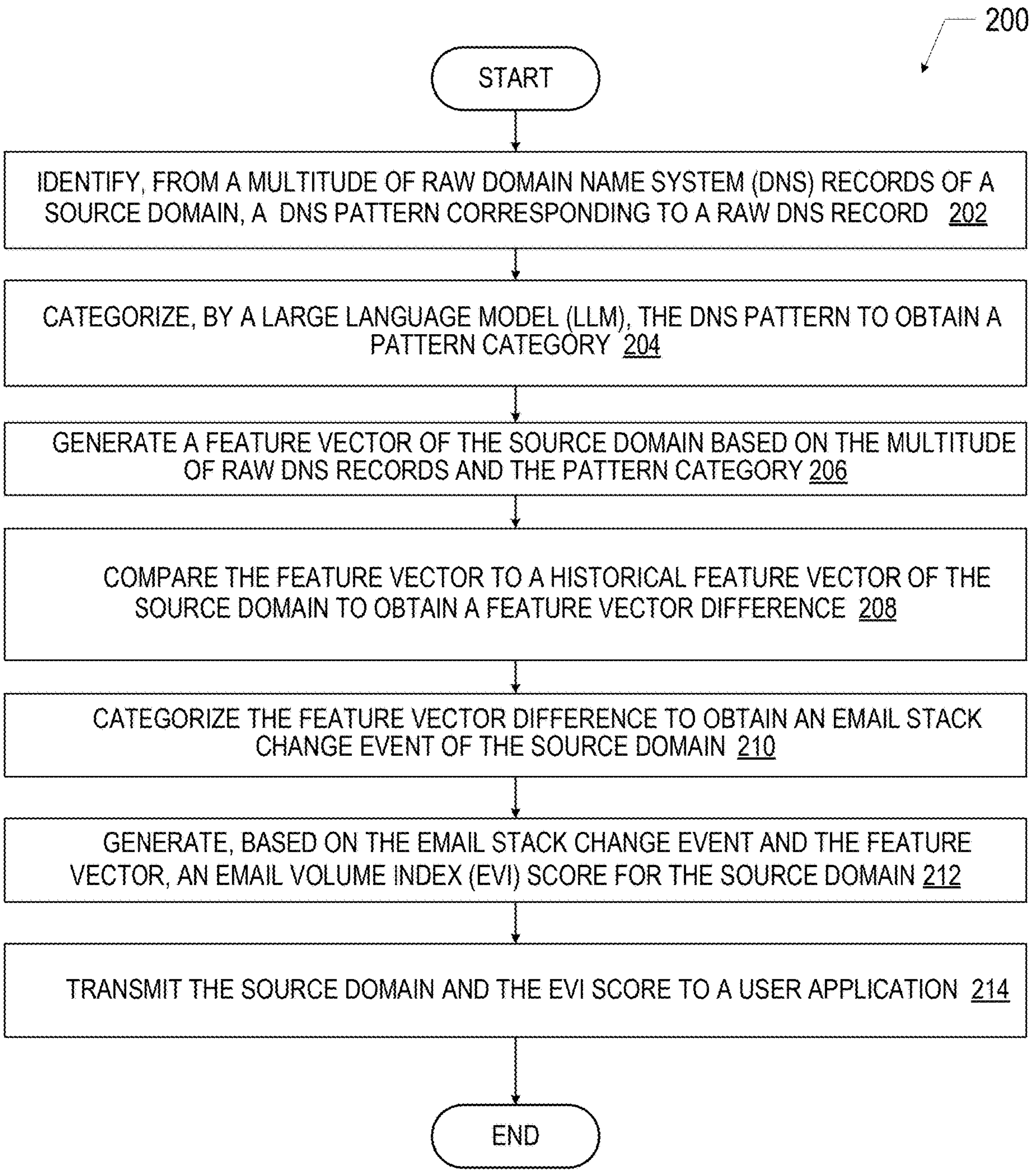
FIG. 2 shows a flowchart of a method, in accordance with one or more embodiments.

FIG. 2 shows a flowchart 200 of a method for extracting and dynamically discovering patterns in DNS records, in accordance with one or more embodiments. The method of FIG. 2 may be implemented using the system of FIG. 1 and one or more of the steps may be performed on or received at one or more computer processors (108). While the various steps in the flowchart 200 are presented and described sequentially, at least some of the steps may be executed in different orders, may be combined, or omitted, and at least some of the steps may be executed in parallel. Furthermore, the steps may be performed actively or passively.

In one or more embodiments, the method of FIG. 2 encompasses ingesting a multitude of raw DNS records from a source domain. The source domain may be provided as part of a request from a user application to calibrate the source domain's email technology stack for potential recommendations to improve the email technology stack. A DNS pattern may be detected within the multitude of raw DNS records. A pattern registry may be dynamically updated based on the DNS pattern. The DNS pattern may further be categorized to obtain a pattern category. An analysis of the email technology stack of the source domain, in natural language, may be generated based on the DNS pattern and the pattern category. The email technology stack analysis may then be transmitted to the user application.

The method of FIG. 2 evaluates the ingested DNS records against existing DNS patterns and determines if any newly ingested DNS record represents a new pattern. If so, the pattern registry is updated. Thus, the method captures new and evolving DNS patterns based on observation of data gathered in real-time. Further, the method of FIG. 2 entails computation of metrics (such as recency-weighted scores) in real-time to decide whether a detected pattern should be promoted to a higher state or added as a new pattern. The method thus obviates the need for manual intervention or batch updates. Moreover, the categorization of patterns (e.g., by the LLM) occurs as patterns emerge, ensuring that the categorization reflects the latest extant DNS configurations and behaviors. The pattern registry grows, and changes dynamically as new patterns are discovered, and old ones become less relevant.

In Block 202, a domain name system (DNS) pattern corresponding to a raw DNS record of a source domain is identified from a multitude of raw DNS records of the source domain. In one or more embodiments, the DNS retriever may be configured to ingest, from the source domain, the multitude of raw DNS records that correspond to a timestamp. Further, the raw DNS records may include at least one of a mail exchange (MX) record, a sender policy framework (SPF) record, a domain-based message authentication, reporting and conformance (DMARC) record, and a domainkeys identified mail (DKIM) record.

In one or more embodiments, the raw DNS record may be selected by the pattern analysis engine. The raw DNS record may be further compared to a multitude of DNS patterns stored in the pattern registry. Each DNS pattern stored in the pattern registry may include a DNS record. Further, the DNS patterns may correspond to respective pattern states. In one or more embodiments, responsive to the raw DNS record matching a subset of patterns having candidate pattern states (i.e., the pattern state is "candidate"), a timestamp of the raw DNS record may be obtained. Further, a recency-weighted score may be computed for the raw DNS record using an exponential decay function applied to timestamps of the subset of patterns. Furthermore, responsive to the recency-weighted score exceeding a promotion threshold, the raw DNS record may be added as a new DNS pattern to the pattern registry and a promoted pattern state (i.e., a pattern state of "promoted") is assigned to the new DNS pattern. In one or more embodiments, the promotion threshold may be set as a common threshold across diverse domains. In other embodiments, the promotion threshold may be set to a domain-specific threshold for the particular domain.

A check may be performed to verify that the new DNS pattern added as a "promoted" pattern is not a duplicate of other previously added promoted DNS patterns. Accordingly, in one or more embodiments, responsive to the recency-weighted score exceeding the promotion threshold, the raw DNS record may be compared to a second subset of DNS patterns having promoted pattern states. The raw DNS record is added as a new DNS pattern responsive to the raw DNS record not matching the second subset of DNS patterns.

In Block 204, the DNS pattern is categorized to obtain a pattern category by a large language model (LLM). In one or more embodiments, the DNS pattern may be selected from the pattern registry. The DNS pattern may have a "promoted" pattern state. The DNS pattern is processed by the LLM to generate the pattern category, and the pattern category is assigned to the DNS pattern in the pattern registry.

In Block 206, a feature vector of the source domain is generated based on the multitude of raw DNS records and the pattern category. In one or more embodiments, the feature vector may be obtained for the source domain at a first timestamp. The pattern analysis engine may extract features derived from the raw DNS records (e.g., MX configuration changes, SPF mechanism composition, DMARC policy level, DKIM key rotation signals) in combination with the LLM-generated pattern category, thereby providing a structured representation of the source domain's email stack state.

In Block 208, the feature vector is compared to a historical feature vector of the source domain to obtain a feature vector difference. In one or more embodiments, the historical feature vector may be obtained from a feature store. The historical feature vector may correspond to a second timestamp prior to the first timestamp. The feature vector difference is obtained by comparing corresponding features of the historical feature vector and the current feature vector. Specifically, a first feature of the historical feature vector and a second feature of the feature vector may be compared. The first feature may correspond to the second feature.

In Block 210, the feature vector difference is categorized to obtain an email stack change event of the source domain. In one or more embodiments, the difference is categorized by the LLM to generate the email stack change event, and the email stack change event is assigned to the feature vector. The email stack change event characterizes the difference between the feature vector and the historical feature vector. Thereby downstream scoring logic may use the email stack change event alongside the current feature values.

In Block 212, an email volume index (EVI) score is generated for the source domain based on the email stack change event and the feature vector. In one or more embodiments, corresponding weights may be assigned to respective features of the feature vector and may be aggregated to obtain a feature score. Further, corresponding second weights may be assigned to email stack change events and may be aggregated to obtain an email stack change boost score. Furthermore, the feature score and the email stack change boost score may be aggregated to obtain the EVI score. In one or more embodiments, a percentile rank of the EVI score may be computed relative to a cohort distribution. The cohort distribution may include EVI scores for a cohort that includes the source domain. A tier label may be assigned to the source domain based on the percentile rank. Further, a multitude of reason codes may be generated by the LLM from the feature vector and the email stack change event to explain the EVI score and tier assignment in natural language.

In Block 214, the source domain and the EVI score are transmitted to a user application. In one or more embodiments, the multitude of reason codes and the tier label are transmitted with the source domain and the EVI score to the user application, thereby enabling user-facing analytics and actionable insights consistent with the generated scoring and categorization outputs.

FIGS. 3A and 3B show an example of candidate domains presented in the user interface, for further engagement for recommendation of email technology stack enhancements/optimizations, in accordance with one or more embodiments. The following example is for explanatory purposes only and not intended to limit the scope of one or more embodiments.

In FIG. 3A, Column 302 shows the domain names for which candidate patterns are being evaluated. Each row corresponds to a unique domain, such as 092xh4nz.com, 100hdideas.org, and 145.acp. These domains represent entities where email-related configurations or behaviors have been observed and analyzed.

Columns 304 and 306 provide evaluation metrics for each domain. Column 304 lists the EVI score, indicating the strength or relevance of the candidate pattern for that domain. For example, 092xh4nz.com has a score of 0, while 100hdideas.org has a score of 88. Column 306 specifies the tier classification, such as "Tier 3 (Low)" or "Tier 2 (Medium)," which groups domains based on their evaluation score ranges or strategic importance.

Column 308 contains reason codes that explain why a domain is included as a candidate. These codes provide insight into observed behaviors or opportunities, such as "Standard Profile," "Competitive Insight: Uses competitor(s) (Klaviyo)," or "Strong DMARC Reject Policy." Some entries include multiple reasons, for example, "Opportunity: Potential to consolidate multiple marketing platforms; Competitive Insight: Uses competitor(s) (Amazon SES, HubSpot)."

In FIG. 3B, Columns 310, 312, 314, 316, and 318 capture configuration and integration attributes associated with each domain. Column 310 shows the DMARC policy applied by the domain, such as "none" or "reject," indicating the level of email authentication enforcement. Column 312 lists email service providers (ESPs) or marketing platforms used by the domain, such as Klaviyo, Mailchimp, or HubSpot. Column 314 identifies the primary mail system, including Google Workspace, Microsoft Outlook, or self-hosted solutions. Column 316 specifies security providers or other email authentication services, such as Valimail (SPF Alignment). Column 318 indicates platform integrations, such as Google, Shopify, or Facebook, which may influence marketing or transactional email strategies.

Together, the tables shown in FIGS. 3A and 3B columns provide a comprehensive feature set for each candidate domain, enabling multi-factor evaluation of email technology stack characteristics, and integration opportunities.

FIG. 4 shows an example of using an exponential decay formula to weight occurrences of patterns in raw DNS records across diverse domains, to evaluate whether a given pattern is eligible for promotion, in accordance with one or more embodiments. The following example is for explanatory purposes only and not intended to limit the scope of one or more embodiments.

Block 402 shows an example of recency-weighted score parameters used to evaluate a candidate pattern for promotion. The candidate pattern in this example is include: _.netblocks.mimecast.com. The parameters include a half-life (λ) of 30 days, meaning each sighting's weight halves every 30 days. The current evaluation time ($t_0$) is Dec. 12, 2025, at 00:00 UTC. Sightings refer to occurrences of the candidate pattern observed in DNS records, each from a unique domain and recorded with a timestamp. Thresholds are defined for promotion: a minimum of five unique domains and a minimum recency-weighted score of 2.0. That is, the candidate pattern occurrence needs to be observed from a minimum of five unique domains, and the recency-weighted score needs to be greater than or equal to 2.0, to be deemed eligible to transition to a "promoted" pattern state.

Block 404 presents an example of an exponential decay formula used to compute the weight for each sighting. For a sighting observed at time $t_i$, with age $\Delta t = t_o - t_i$ (in days), the decayed weight $w_i$ is given by:

$$w_i = \left(\frac{1}{2}\right)^{\frac{\Delta t}{\lambda}},$$

where λ is the half-life in days. The recency-weighted score S is the sum of all decayed weights across unique domains:

$$S = \sum_{i=1}^{N} w_i,$$

where N is the number of unique domains in which the pattern was observed. Other formulae or methods of obtaining recency-weighted scores may be applied and used.

Block 406 illustrates observed sightings across unique domains. Each row represents a domain where the candidate pattern was observed, along with the sighting timestamp, the age Δt in days (calculated as the difference between $t_o$ and the sighting time), and the decayed weight $w_i$ computed using exponential decay. For example, the pattern from the domain alpha.com was observed on Dec. 10, 2025, with an age of 2 days and a decayed weight of approximately 0.955. Similarly, the pattern was observed from the domain zeta.co on Aug. 1, 2025, with an age of 133 days and a decayed weight of approximately 0.099. The table demonstrates how older sightings contribute less to the score due to decay.

Block 408 shows the computation of the recency-weighted score and promotion decision. The decayed weights from Block 406 are summed: 0.955+0.667+0.395+0.287+0.193+0.099=2.696. The number of unique domains is six. The promotion decision checks two conditions: (1) whether the unique-domain threshold is met (N=6≥5), and (2) whether the recency-weighted score meets the threshold (S=2.696≥2.0). Both conditions pass, hence the candidate pattern is eligible for promotion.

FIG. 5 shows an example of raw DNS records retrieved from public domains, in accordance with one or more embodiments. The following example is intended for explanatory purposes only and not intended to limit the scope of one or more embodiments.

Section 502 shows raw DNS data from the domain jpmorganchase.com. The records include multiple TXT records for domain verification purposes, such as facebook-domain-verification, mongodb-site-verification, and Dynatrace-site-verification. These TXT records may be used by external services to confirm ownership of the domain. Additionally, SPF (Sender Policy Framework) records are present, specifying authorized IP ranges for sending email on behalf of the domain. A DMARC (Domain-based Message Authentication, Reporting, and Conformance) record is also included, indicating a policy of p-reject and providing reporting URIs for aggregate and forensic reports. The MX (Mail Exchange) record points to mail.protection.outlook.com, which identifies the mail server responsible for handling inbound email for the domain.

Section 504 shows raw DNS data from the domain berkshirehathaway.com. The records include a TXT record with a numeric identifier, likely used for verification or tracking. An SPF record is present, specifying "include: spf.protection.outlook.com-all," which authorizes Microsoft Outlook® mail servers for sending email. A DMARC record is also included, specifying a strict policy of "p-reject," which enforces rejection of unauthenticated email messages. The MX record points to mail.protection.outlook.com, indicating that inbound email is handled by Microsoft®'s email protection service.

Section 506 shows raw DNS data from the domain icbc-us.com. The records include multiple MX records with varying priorities (10, 20, 50), all pointing to mail servers under the icbc.com.cn domain. The configuration inferred from the raw DNS data indicates a tiered mail routing setup for redundancy and load balancing. An SPF record is also present, specifying include: spf.icbc-us.com-all, which authorizes mail servers from both the U.S. and China domains to send email on behalf of icbc-us.com. This SPF configuration reflects a multi-region email infrastructure.

Section 508 shows raw DNS data from the domain aramco.com. The records consist of multiple MX records with priorities 5 and 10, pointing to mail servers such as smtp1.aramco.com, smtp2.aramco.com, and smtp8.aramco.com. The MX records indicate a distributed mail server architecture for handling inbound email traffic. No SPF or DMARC records are shown in this section, which may suggest that the domain either does not publish these records, or they were not retrieved during the data collection process.

The methodology described herein may be used on large datasets of raw DNS records sampled from diverse domains to accurately dynamically detect and identify DNS patterns and email technology stack change events. The methodology further provides precise inputs of the characteristics of the email technology stack changes. As a result, specific lead signals may be generated for domain operators.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 6A:
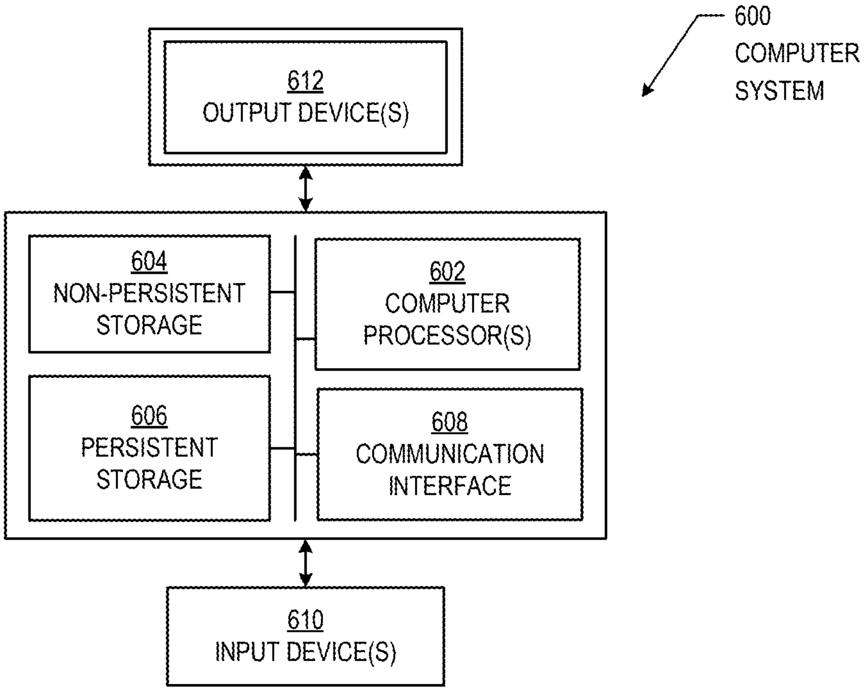
FIGS. 6A and 6B show an example of a computing system, in accordance with one or more embodiments.

For example, as shown in FIG. 6A, the computing system (600) may include one or more computer processor(s) (602), non-persistent storage device(s) (604), persistent storage device(s) (606), a communication interface (608) (e.g., Bluetooth interface, infrared interface, network interface, optical interface, etc.), and numerous other elements and functionalities that implement the features and elements of the disclosure. The computer processor(s) (602) may be an integrated circuit for processing instructions. The computer processor(s) (602) may be one or more cores, or micro-cores, of a processor. The computer processor(s) (602) includes one or more processors. The computer processor(s) (602) may include a central processing unit (CPU), a graphics processing unit (GPU), a tensor processing unit (TPU), combinations thereof, etc.

The input device(s) (610) may include a touchscreen, keyboard, mouse, microphone, touchpad, electronic pen, or any other type of input device. The input device(s) (610) may receive inputs from a user that are responsive to data and messages presented by the output device(s) (612). The inputs may include text input, audio input, video input, etc., which may be processed and transmitted by the computing system (600) in accordance with one or more embodiments. The communication interface (608) may include an integrated circuit for connecting the computing system (600) to a network (not shown) (e.g., a local area network (LAN), a wide area network (WAN) such as the Internet, mobile network, or any other type of network) or to another device, such as another computing device, and combinations thereof.

Further, the output device(s) (612) may include a display device, a printer, external storage, or any other output device. One or more of the output device(s) (612) may be the same or different from the input device(s) (610). The input device(s) (610) and output device(s) (612) may be locally or remotely connected to the computer processor(s) (602). Many different types of computing systems exist, and the aforementioned input device(s) (610) and output device(s) (612) may take other forms. The output device(s) (612) may display data and messages that are transmitted and received by the computing system (600). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid-state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (602), is configured to perform one or more embodiments, which may include transmitting, receiving, presenting, and displaying data and messages described in the other figures of the disclosure.

Figure 6B:
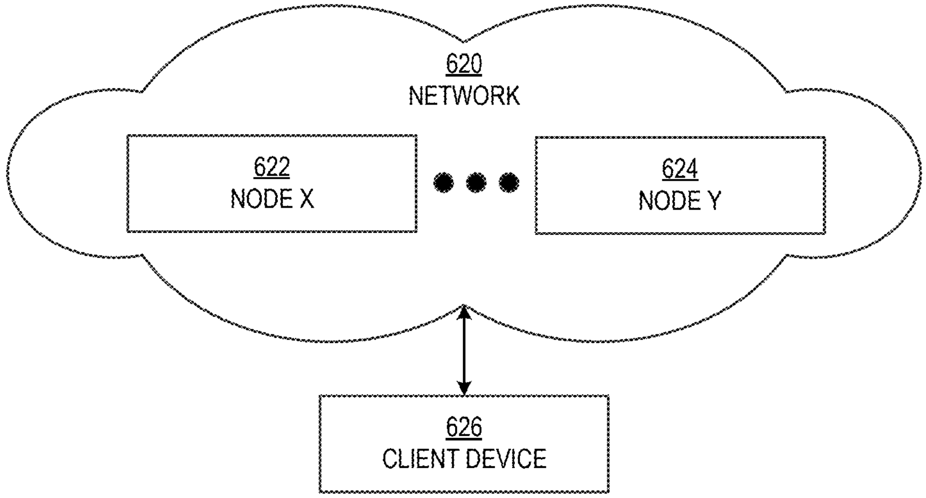

The computing system (600) in FIG. 6A may be connected to, or be a part of, a network. For example, as shown in FIG. 6B, the network (620) may include multiple nodes (e.g., node X (622) and node Y (624), as well as extant intervening nodes between node X (622) and node Y (624)). Each node may correspond to a computing system, such as the computing system shown in FIG. 6A, or a group of nodes combined may correspond to the computing system shown in FIG. 6A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (600) may be located at a remote location and connected to the other elements over a network.

The nodes (e.g., node X (622) and node Y (624)) in the network (620) may be configured to provide services for a client device (626). The services may include receiving requests and transmitting responses to the client device (626). For example, the nodes may be part of a cloud computing system. The client device (626) may be a computing system, such as the computing system shown in FIG. 6A. Further, the client device (626) may include or perform all or a portion of one or more embodiments.

The computing system of FIG. 6A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method, comprising:

identifying, from a plurality of raw domain name system (DNS) records of a source domain, a DNS pattern corresponding to a raw DNS record;

categorizing, by a large language model (LLM), the DNS pattern to obtain a pattern category;

generating a feature vector of the source domain based on the plurality of raw DNS records and the pattern category;

comparing the feature vector to a historical feature vector of the source domain to obtain a feature vector difference;

categorizing the feature vector difference to obtain an email stack change event of the source domain;

calculating, based on the feature vector, and the email stack change event, an email volume index (EVI) score for the source domain; and transmitting the source domain and the EVI score to a user application.

2. The method of claim 1, further comprising:

ingesting, from the source domain, the plurality of raw DNS records, wherein the plurality of raw DNS records comprises at least one of a mail exchange (MX) record, a sender policy framework (SPF) record, a domain-based message authentication, reporting and conformance (DMARC) record, and a domainkeys identified mail (DKIM) record, the plurality of raw DNS records corresponds to the source domain, and the plurality of raw DNS records corresponds to a timestamp.

3. The method of claim 1, further comprising:

identifying the DNS pattern by performing operations comprising:

selecting the raw DNS record from the plurality of raw DNS records, comparing the raw DNS record to a plurality of DNS patterns from a pattern registry, wherein the plurality of DNS patterns each comprise a DNS record and correspond to a pattern state, responsive to the raw DNS record matching a subset of DNS patterns of the plurality of DNS patterns, the subset of DNS patterns having candidate pattern states, obtaining a timestamp of the raw DNS record, computing a recency-weighted score for the raw DNS record using an exponential decay function applied to timestamps of the subset of DNS patterns and the timestamp, responsive to the recency-weighted score exceeding a promotion threshold, adding the raw DNS record as a new DNS pattern to the pattern registry, and assigning a promoted pattern state to the new DNS pattern.

4. The method of claim 3, further comprising:

responsive to the recency-weighted score exceeding the promotion threshold, comparing the raw DNS record to a second subset of DNS patterns of the plurality of DNS patterns, the second subset of DNS patterns having promoted pattern states, and adding the raw DNS record as a new DNS pattern responsive to the raw DNS record not matching the second subset of DNS patterns.

5. The method of claim 1, further comprising:

selecting, from a pattern registry, the DNS pattern, wherein the DNS pattern corresponds to a promoted pattern state;

processing, by the LLM, the DNS pattern to generate the pattern category; and assigning the pattern category to the DNS pattern in the pattern registry.

6. The method of claim 1, further comprising:

obtaining the feature vector for the source domain, wherein the feature vector corresponds to a first timestamp;

obtaining, from a feature store, the historical feature vector of the source domain, the historical feature vector corresponding to a second timestamp, wherein the second timestamp is prior to the first timestamp;

comparing the historical feature vector and the feature vector to obtain a difference between a first feature of the historical feature vector and a second feature of the feature vector, wherein the first feature corresponds to the second feature;

categorizing, by the LLM, the difference to generate the email stack change event; and assigning the email stack change event to the feature vector.

7. The method of claim 1, further comprising:

assigning corresponding weights to respective features of the feature vector of the source domain; and aggregating the corresponding weights to obtain a feature score.

8. The method of claim 7, further comprising:

assigning corresponding second weights to email stack change events of the feature vector;

aggregating the corresponding second weights to obtain an email stack change boost score; and aggregating the feature score and the email stack change boost score to obtain the EVI score.

9. The method of claim 1, further comprising:

computing a percentile rank of the EVI score for the source domain, relative to a cohort distribution of EVI scores, wherein the cohort distribution comprises EVI scores for a cohort comprising the source domain; and assigning a tier label to the source domain based on the percentile rank.

10. The method of claim 1, further comprising:

generating, by the LLM, from the feature vector and the email stack change event, a plurality of reason codes for the source domain; and transmitting the plurality of reason codes with the source domain and the EVI score to the user application.

11. The method of claim 1, further comprising:

receiving, from the user application, a request to calibrate the source domain based on the plurality of raw DNS records; and transmitting, in response to the request, a plurality of reason codes, and a tier label of the source domain with the source domain and the EVI score to the user application.

12. A system, comprising:

at least one hardware processor;

a temporal difference engine, executing on the at least one computer processor;

a large language model (LLM), executing on the at least one computer processor; and a pattern analysis engine, executing on the at least one computer processor and configured to:

identify, from a plurality of raw domain name system (DNS) records of a source domain, a DNS pattern corresponding to a raw DNS record, cause the LLM to categorize the DNS pattern to obtain a pattern category, generate a feature vector of the source domain based on the plurality of raw DNS records and the pattern category, and cause the temporal difference engine to perform operations comprising:

comparing the feature vector to a historical feature vector of the source domain to obtain a feature vector difference, categorizing the feature vector difference to obtain an email stack change event of the source domain, calculating, based on the feature vector, and the email stack change event, an email volume index (EVI) score for the source domain, and transmitting the source domain and the EVI score to a user application.

13. The system of claim 12, further comprising a domain name system (DNS) retriever, configured to:

ingest, from the source domain, the plurality of raw DNS records, wherein the plurality of raw DNS records comprises at least one of a mail exchange (MX) record, a sender policy framework (SPF) record, a domain-based message authentication, reporting and conformance (DMARC) record, and a domainkeys identified mail (DKIM) record, the plurality of raw DNS records corresponds to the source domain, and the plurality of raw DNS records corresponds to a timestamp.

14. The system of claim 12, wherein the pattern analysis engine is further configured to identify the DNS pattern by performing operations comprising:

selecting the raw DNS record from the plurality of raw DNS records;

comparing the raw DNS record to a plurality of DNS patterns from the pattern registry, wherein the plurality of DNS patterns each comprise a DNS record and correspond to respective pattern states;

responsive to the raw DNS record matching a subset of patterns of the plurality of DNS patterns, the subset of DNS patterns having candidate pattern states, obtaining a timestamp of the raw DNS record, computing a recency-weighted score for the raw DNS record using an exponential decay function applied to timestamps of the subset of patterns, and responsive to the recency-weighted score exceeding a promotion threshold, adding the raw DNS record as a new DNS pattern to the pattern registry, and assigning a promoted pattern state to the new DNS pattern.

15. The system of claim 14, wherein the pattern analysis engine is further configured to identify the DNS pattern by performing operations further comprising:

responsive to the recency-weighted score exceeding the promotion threshold, comparing the raw DNS record to a second subset of DNS patterns of the plurality of DNS patterns, the second subset of DNS patterns having promoted pattern states, and adding the raw DNS record as a new DNS pattern responsive to the raw DNS record not matching the second subset of DNS patterns.

16. The system of claim 12, wherein the pattern analysis engine is further configured to:

select, from the pattern registry, the DNS pattern, wherein the DNS pattern corresponds to a promoted pattern state;

cause the LLM to process the DNS pattern to generate the pattern category; and assign the pattern category to the DNS pattern in the pattern registry.

17. The system of claim 12, wherein the temporal difference engine is further configured to:

obtain the feature vector for the source domain, wherein the feature vector corresponds to a first timestamp;

obtain, from a feature store, the historical feature vector of the source domain, the historical feature vector corresponding to a second timestamp, wherein the second timestamp is prior to the first timestamp;

compare the historical feature vector and the feature vector to obtain a difference between a first feature of the historical feature vector and a second feature of the feature vector, wherein the first feature corresponds to the second feature;

categorize, by the LLM, the difference to generate the email stack change event; and assigning the email stack change event to the feature vector.

18. The system of claim 12, wherein the temporal difference engine is further configured to:

assign corresponding weights to respective features of the feature vector of the source domain;

aggregate the corresponding weights to obtain a feature score;

assign corresponding second weights to email stack change events of the feature vector;

aggregate the corresponding second weights to obtain an email stack change boost score; and aggregate the feature score and the email stack change boost score to obtain the EVI score.

19. The system of claim 12, wherein the pattern analysis engine is further configured to:

compute a percentile rank of the EVI score for the source domain, relative to a cohort distribution of EVI scores, wherein the cohort distribution comprises EVI scores for a cohort comprising the source domain;

assign a tier label to the source domain based on the percentile rank;

cause the LLM to generate, from the feature vector and the email stack change event, a plurality of reason codes for the source domain; and transmit the plurality of reason codes and the tier label with the source domain and the EVI score to the user application.

* * * * *